No. 864,685. PATENTED AUG. 27, 1907.
N. B. POST.
POPPING MACHINE.
APPLICATION FILED DEC. 31, 1904.

No. 864,685. PATENTED AUG. 27, 1907.
N. B. POST.
POPPING MACHINE.
APPLICATION FILED DEC. 31, 1904.

UNITED STATES PATENT OFFICE.

NATHANIEL B. POST, OF ST. LOUIS, MISSOURI, ASSIGNOR TO RUECKHEIM BROS. & ECKSTEIN, OF CHICAGO, ILLINOIS, A CORPORATION.

POPPING-MACHINE.

No. 864,685.  Specification of Letters Patent.  Patented Aug. 27, 1907.

Application filed December 31, 1904. Serial No. 239,033.

*To all whom it may concern:*

Be it known that I, NATHANIEL B. POST, a citizen of the United States, and a resident of St. Louis, State of Missouri, have invented certain new and useful Improvements in Popping-Machines, of which the following is declared to be a full, clear, and exact description.

The improvement relates to a machine for popping corn, and in particular to that class of popping machines in which the corn is placed in a rotary cylinder provided with means for separating and delivering the popped corn. In prior machines of this type, it is necessary to arrest the operation of the machine from time to time in order to discharge the waste corn; that is the corn which, for one reason and another will not pop and imperfectly popped corn. Such machines are necessarily wasteful, since if it is stopped by the operator too soon, some of the good corn is wasted, whereas if it is not stopped soon enough the heat employed is not economically utilized.

The chief object of the present invention is to provide a machine which is continuous in operation. That is to say, one in which the fresh corn is continuously fed to the popping chamber. The popped corn is continuously separated and removed therefrom and means are provided for continuously and automatically delivering the waste corn.

Other objects of the invention are to provide means whereby the corn may be gradually brought to popping heat and whereby the heat that is not utilized in the popping chamber, may be used for thus preliminary heating the new corn.

The invention also seeks to provide means whereby the corn to be popped may be gradually fed from end to end of the popping chamber or cylinder in contact with the outer surface thereof, and the waste automatically discharged at one end of the cylinder. Means are also provided whereby the heat may be variably regulated from end to end of the popping chamber or cylinder, so that there may be as little waste as possible.

Another object of the invention is to provide means to protect the popped corn as soon as it is separated from the unpopped corn, from the flame of the gas burners, or other source of heat employed.

With these and other objects in view, as will presently appear, the invention consists in the features of construction, combinations and arrangements of parts hereinafter set forth, illustrated in the accompanying drawings and more particularly pointed out in the appended claims.

In the drawings, Fig. 4 is a vertical cross section thereof.

The machine casing comprises a lower base portion 10 in the upper portion of which and to one side of the center, is arranged the fire box 11. The enlarged main portion of the machine casing within which is located the popping chamber or cylinder 12, is mounted upon the base 10 and is horizontally divided in line with the axis of the popping cylinder into upper and lower sections 13 and 14. A hood 15 within which is mounted the rotatable heating cylinder 16, is mounted centrally upon the upper casing section 13.

Figure 3:
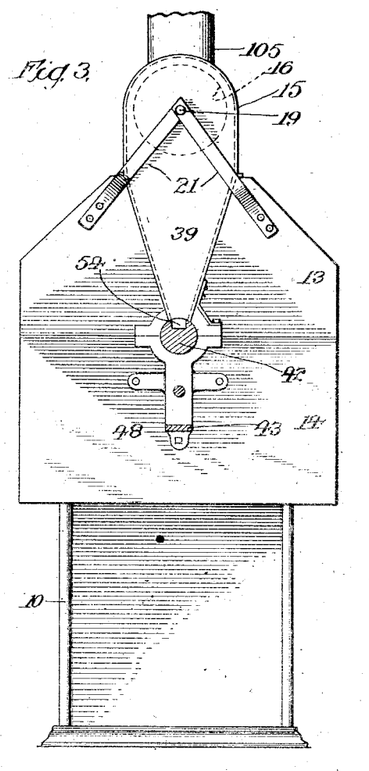
Fig. 3 is an elevation of the opposite end of the machine.

The preliminary heating cylinder 16 is formed of wire gauze of fine mesh and is provided with heads 17 and 18 mounted upon a shaft 19. Shaft 19 is journaled at one end in an upright 20 and at the opposite end is journaled in a pair of brace straps 21 (see Fig. 3) secured to the casing 13.

The hopper 22 within which the corn to be popped is placed, is secured to the hood 15 at the inlet end of the heating cylinder 16. A cylinder valve 23 (see Figs. 5, 6 and 7) is mounted upon one end of the shaft 19 to rotate therewith and is secured, as shown, to the head 18 of the heating cylinder. Cylinder valve 23 rotates, as shown, at the lower discharge end 22′ of hopper 22 and is provided with an inclined passage 24 which opens at its inner end through the head 18 of the heating cylinder. The opposite outer end of the passage 24 is placed, once every revolution, in communication with the hopper 22 so that, at each revolution a charge of corn passes from the hopper 22 into the heating cylinder 16. A sliding gate 25 is arranged to vary the size of the discharge outlet 22′ of the hopper 22, so that the feed of corn from the hopper may be nicely regulated.

Figures 5, 6, 7, 8, 9:
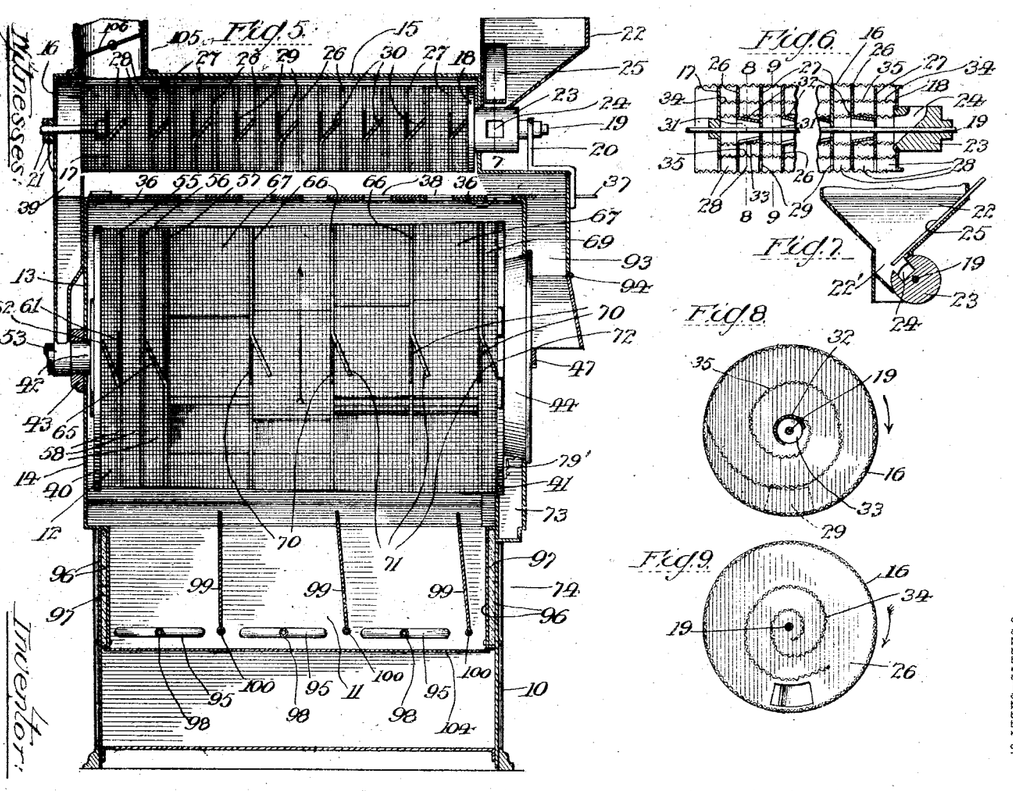
Fig. 5 is a longitudinal section of the machine with the heating and popping cylinders shown in elevation.
Fig. 6 is a longitudinal section of the preliminary heating cylinder.
Fig. 7 is a detail section of the feed-hopper taken on line 7 of Fig. 5.
Figs. 8 and 9 are enlarged detail cross section of the heating cylinder taken on lines 8—8 and 9—9 of Fig. 6.

The heating cylinder 16 is divided by a number of vertical cross partitions 26 and 27, into a series of compartments 28. The partitions 26 and 27 are alternately arranged, as shown. Each partition 27 is provided at its periphery or edge portion, with an opening 29 and with an inclined deflector 30 which projects laterally toward the inlet end of the cylinder and into contact with the adjacent partition 26. Each partition 26 is provided at its center with an opening 31 and with an offset conical portion 32, as clearly shown in Fig. 6, leading from the opening 31 and projecting laterally therefrom toward the inlet end of the cylinder into the adjacent compartment 28, and into engagement with the adjacent partition 27. Each sectional portion is provided with a lateral inlet 33 (see Fig. 8). In the compartments 28 of the heating cylinder are arranged spiral strips 34 and 35, which are preferably formed of fine wire gauze. The spirals 34 and 35 are alternately arranged in the series of compartments 28 and, as indicated in Figs. 8 and 9, are coiled in opposite directions. That is to say, spirals 34 are so coiled that as the cylinder rotates in the direction indicated by the arrow, the separate charges of corn fed into the heating cylinder by valve 24, will pass from the center of the spiral outwardly to the periphery of the cylinder 16. Whereas spiral 35 coiled in the opposite direction is connected at one end to the cylinder 16 and will feed the separate charges of corn from the periphery towards the center as the heating cylinder rotates in the direction indicated by the arrows.

The separate charges of corn are fed by valve 23 into the center of the first compartment 28 and into the center of the first spiral 34. In this first compartment and first spiral the separate charges of corn are fed outwardly to the periphery of the cylinder and at this point, are met by the deflecting plate 30 of the adjacent partition 26 and deflected through the opening 29 into the second compartment. The separate charges of corn are then picked up upon the spiral 35 and fed thereby to the center of the second compartment through the opening 33, into the conical portion 32 of the adjacent partition 26 and through the opening 31 in the partition 26 into the third compartment. The corn is fed in like manner through the remaining compartments so that the separate charges of corn are gradually fed from end to end of the heating cylinder, and as they are so fed are alternately passed back and forth from the periphery to the center thereof upon the spirals 34 and 35 so that they are at all times agitated and turned over and over to expose all portions of each kernel to uniformly and gradually raise the temperature of the corn.

The preliminary heater 16 utilizes the hot air and products of combustion passing from the main casing 13—14 and which would otherwise be wasted. The upper portion of the casing section 13, preferably forms a partition between the interior of the main casing and the hood 15, and this partition is provided with a series of openings 36. A valve or gate 37 is arranged to slide upon the upper face of the casing section 13 and is provided with a corresponding series of openings 38 adapted to register to a great or less extent with the openings 36, and thus regulate the amount of heat which passes to the preliminary heater 16. The heat to cylinder 16 should be so regulated that the corn therein will be considerably heated preparatory to popping, but will not be popped in this preliminary heating cylinder.

The discharge end of the heating cylinder 16 delivers into a hopper 39 connected to the end of the hood 15 and depending therefrom as shown. This hopper is arranged to deliver the corn into the popping chamber or cylinder.

Figure 2:
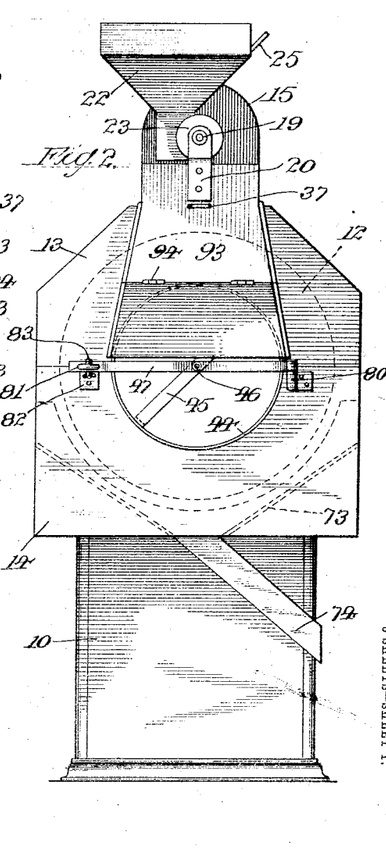
Fig. 2 is an elevation of the delivery end of the same.

Popping chamber or cylinder 12 is preferably formed of fine wire gauze connected at the ends to the heads 40 and 41. A short journal or stud 42, fixed to the head 40 at the inlet end of the popping cylinder, is mounted in suitable bearings upon a bracket 43 fixed to the end of the casing section 14. A delivery cone 44 for the popped corn, is set within the popping cylinder 12. Its larger delivery end projects beyond the head 41 of the popping cylinder and extends through the end wall of the main casing 13—14 (see Figs. 5 and 10). A cross piece 45 is fixed in diametrical position at the outer end of the cone 44 and is pivotally connected by a bolt 46 to the cross piece or support 47. Support 47 is secured as shown, to the outer face of the lower casing section 14 (see Fig. 2). The pivot bolt or journal 46 is in line with the stud or journal 42 and rotatably supports the delivery end of the cone 44 and popping cylinder 12.

Figure 1:
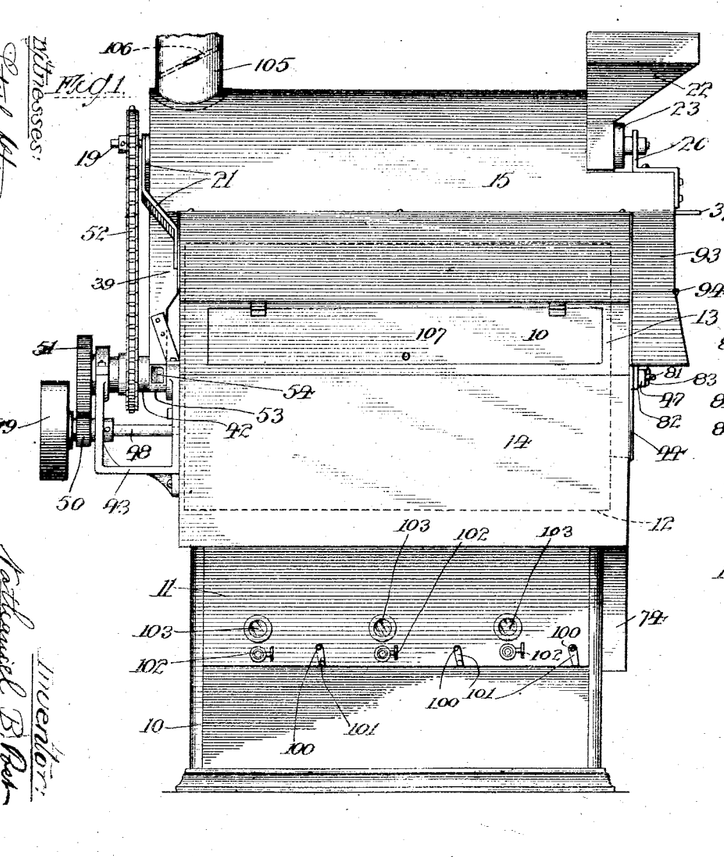
Figure 1 is a side elevation of the improved popping machine.

A short counter shaft 48 (see Fig. 1), carries a pulley 49 on its outer end by which it may be belted to any suitable source of power. A pinion 50 on shaft 48 meshes with the gear 51 upon the outer end of the journal 42 so that the popping cylinder is slowly rotated thereby. The preliminary heating cylinder 16 is preferably driven in unison with the popping cylinder by a chain 52, which passes over sprockets of equal size mounted upon the journal 42 and the end of shaft 19.

Figure 10:
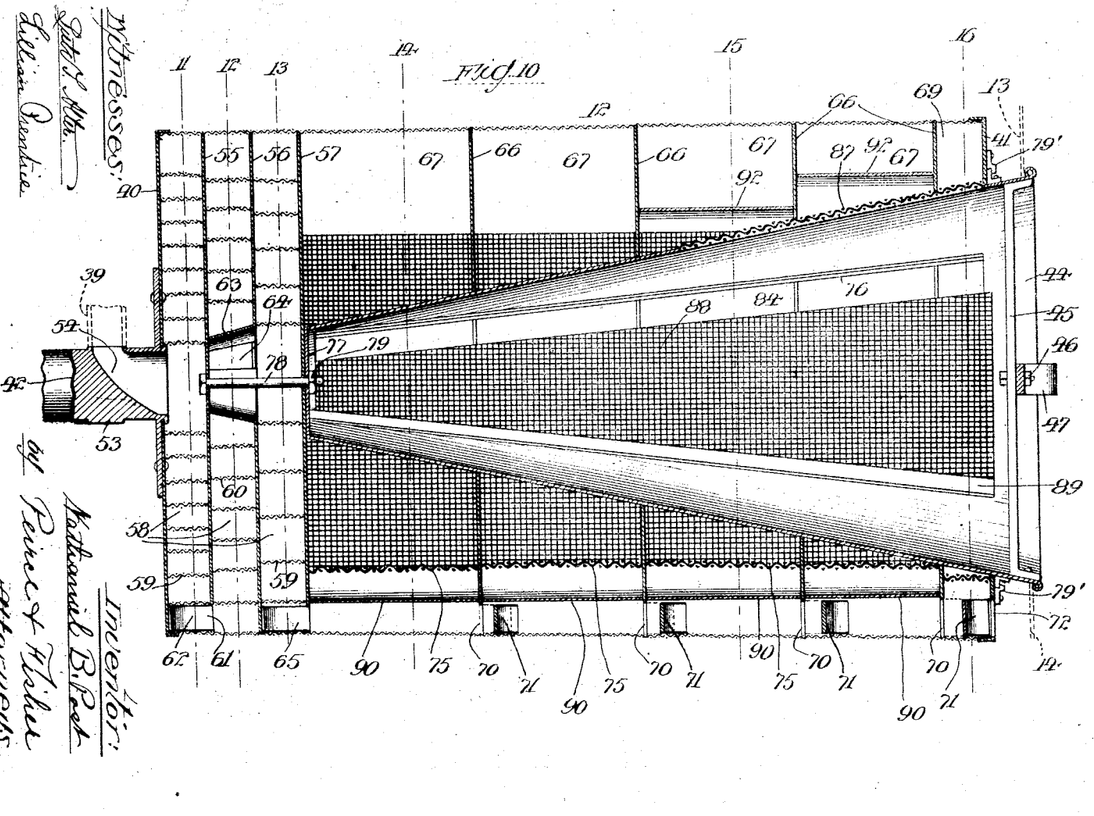
Fig. 10 is an enlarged longitudinal section of the popping cylinder.

As stated, the hopper 39 receives the corn from the heating cylinder 16 and its lower end abuts against an enlarged cylindrical portion 53, upon the stud or journal 42 (see Fig. 10). This portion of the stud or journal 42 forms, in effect, a cylindrical valve and is provided with a passage 54 having an inclined bottom which opens at its inner end through the head 40 of the popping cylinder. The outer end of the passage 54 is arranged to communicate once every revolution with the lower discharge end of the hopper 39, so that the separate charges of corn are fed at regular intervals into the popping cylinder.

A series of partitions 55, 56 and 57 arranged closely adjacent one another at the inlet end of the popping cylinder, form chambers or compartments 58 which constitute an additional preliminary heater for the corn and in which it is raised to popping heat. These partitions and chambers formed thereby, together with the spiral strips 59 and 60, arranged in the chambers, are similar in construction to those of the preliminary heater 16. The spiral strips 59 and 60 are as shown, preferably formed of fine wire gauze.

Figure 11:
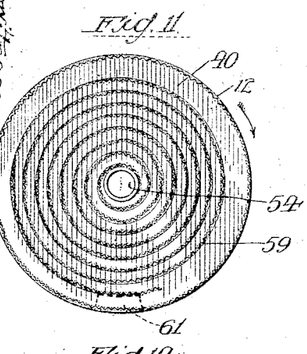
Figs. 11, 12, 13, 14, 15 and 16 are detail cross sections taken on correspondingly numbered lines on Fig. 10.
Figure 12:
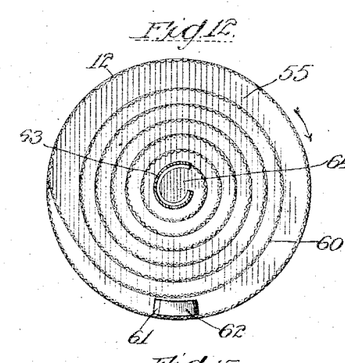
Figure 13:
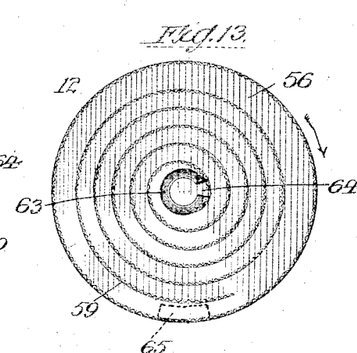

The separate charges of corn are fed through the passage 54 into the central portion of the first chamber 58 and into the central portion of the spiral 59 therein. This spiral is so wound that as the cylinder rotates in the direction of the arrow (see Fig. 11) the separate charges of corn will be fed outwardly towards the periphery of the cylinder 12. At this point the adjacent partition 55 is provided with an opening 61 and an inclined deflector 62, which projects laterally into the first compartment 58 and into engagement with the cylinder head 40 so that the separate charges of corn are deflected at this point by the plate 62 from the first compartment 58 through the opening 61 into the second compartment. The spiral coil 60 in the second compartment is connected at one end to the cylinder 12 and is wound in the opposite direction (see Fig. 12), so that the separate charges of corn are fed towards the center of the cylinder and there delivered into a conical deflector 63. Deflector 63 is connected to the partition 56 and communicates with the central opening in the partition. The deflector is also provided (see Figs. 10 and 12) with a lateral opening 64 and the spiral 60 is connected to the deflector at one edge of this opening. The separate charges of corn are as stated, fed by spiral 60 towards the center of the cylinder and there delivered through opening 64 into deflector 63, from deflector 63 they pass into the third compartment 58 and into the center of the spiral 59 therein. Spiral 59 is so coiled (see Fig. 13) that as the cylinder rotates in the direction of the arrow, the separate charges of corn are passed from the center towards the periphery. At the latter point, partition 57 is provided with an opening and an inclined deflector plate 65 by which the separate charges of corn are deflected into the popping cylinder proper.

As well understood, it is desirable to remove the corn from the heat as soon as it is popped, and for this reason it is not desirable that the corn should be popped in the heating chambers 58, since they are not provided with means for separating the popped corn, but only that in these chambers the corn should be heated to or approximately to the popping heat and delivered into the popping chamber.

In popping rn it is desirable that the corn should be gradually brought to popping heat and that each and every kernel should be thoroughly and uniformly heated through. With the construction described, the separate charges of corn are fed gradually through the preliminary heater 16 and the heating chambers 58 back and forth between the center and periphery of the cylinder 16 and of the cylinder 12 by the spirals, and at the same time the corn is turned over and over so that the kernels are gradually and uniformly heated through and delivered into the popping chamber proper of the cylinder 12 in the right condition to obtain the best results.

In prior popping machines of this type, as soon as the corn to be popped is delivered into the popping chamber and in contact with the outer popping surface thereof, it is free to spread itself over the bottom portion of the cylinder from end to end and as stated, such machines must be stopped from time to time in order to discharge the waste corn. In the present invention, suitable means are provided in the popping chamber proper to retard the passage of the corn from end to end and so as to prevent the corn, as soon as it reaches the cylinder, from spreading out over the bottom. By this means, a gradual or retarded feed of the corn is effected from one end to the other of the popping cylinder, so that only waste corn, which for one reason and another, will not pop, reaches the outlet end of the cylinder and is discharged therefrom. In this manner, the operation of the machine is rendered continuous.

The gradual retarded feed of the corn from one end to the other of the popping cylinder, is preferably effected by making the outlet end of the cylinder somewhat larger than its inlet end. That is to say, the head 41 is slightly larger than the head 40, so that the lower portion of the cylinder is slightly inclined downwardly towards its outlet or discharge end, and the unpopped corn on the lower portion of the cylinder tends to gravitate towards the discharge end. The too rapid movement of the unpopped corn is prevented by a series of baffles or cross partitions 66, which divides the popping chamber proper of the cylinder 12 into a number of comparatively large compartments 67. The partition 66 at the extreme right is located closely adjacent the head 41 so that it forms a comparatively small compartment 69.

Each of the partitions 66 is provided at one portion on its periphery, with an opening 70 and with an inclined deflector plate 71, which extends from the forward edge of the opening 70 and projects laterally towards the discharge end of the popping cylinder. While the popping cylinder 12 rotates, the corn of course remains always in the bottom portion thereof. The openings 70 are arranged in line (see Figs. 5 and 10) and once every revolution these openings come opposite the body of the unpopped corn in the bottom of the cylinder so that a small portion will pass from each compartment into the next adjacent compartment nearer to the discharge end of the cylinder. The deflector plates 71 are so located that as the cylinder rotates in the direction of the arrow (see Fig. 5) it will prevent any corn from passing from one of the compartments 67 back into the compartment nearer to the inlet end of the cylinder. In this manner, the unpopped corn is fed gradually through the several compartments of the popping cylinder 12 and all popped corn is separated therefrom, as hereinafter described, and delivered through the cone 44. The feed of the corn and the heat is so regulated that any unpopped corn which reaches the compartment 69 is waste, that is to say, corn which for one reason and another will not pop, or corn that is cracked open and partially popped. The deflector plate 71 in said last compartment 69, extends as shown in Figs. 5 and 10, into engagement with the head 41, and head 41 is provided at this point and outside of the cone 44 with a discharge opening 72, and the waste corn in the compartment 69 is deflected by the plate 71 therein out through the discharge opening 72 into a hopper 73, provided with a discharge spout 74 (see Fig. 2).

Each of the compartments 67 and 69 of the popping cylinder is provided with a separator screen 75 of coarse mesh (see Figs. 10, 14, 15 and 16). This separator screen is segmental in section and secured at one edge to the outer fine gauze cylinder 12 and at its other edge to an inclined strip 76 which extends from the head 41 to the partition 57 and through the compartments 67 and 69 of the popping cylinder. The separator screen 75 is so located that as the cylinder rotates in the direction of the arrows (see Figs. 14, 15 and 16) the corn in the bottom of the cylinder 12 will be picked up and the large, perfectly popped corn is retained upon the separator screen 75 while the unpopped or imperfectly popped corn will quickly pass therethrough back onto the outer surface of the cylinder 12. The corn passing through the separator screen 75 is subsequently popped and picked up by the screen or passes as waste out of the discharge opening 72.

Figures 14, 15, 17:
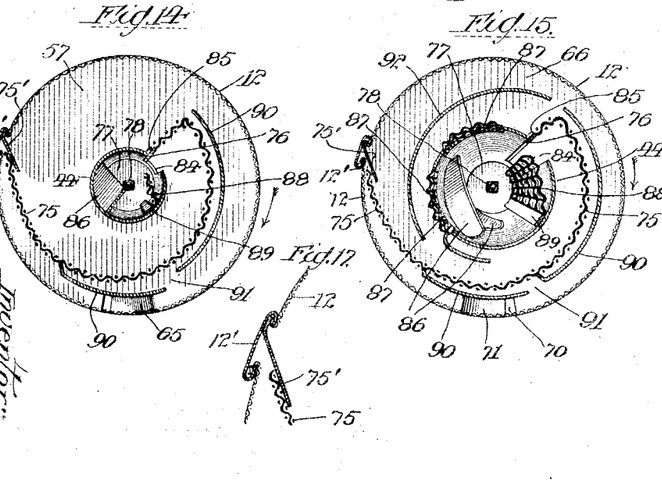
Fig. 17 is an enlarged detail view of parts shown in Figs. 14, 15 and 16.
Figure 16:
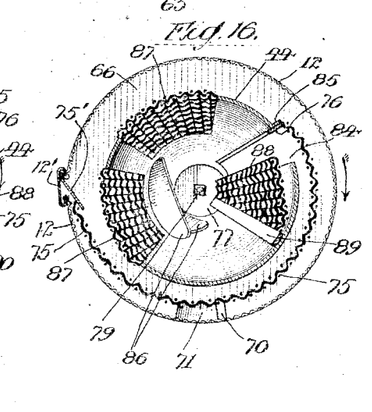

The screen cylinder 12 and the separator screen 75 are preferably connected together by a form of joint illustrated in detail in Fig. 17. As shown, the edges of the cylindrical screen 12 are secured to a longitudinally extending strip 12' having reversed edge portions into which the reverted edges of the screen 12 extend. A longitudinally extending metal plate or strip 75′ extends within one of the reverted edges of the plate 12′ and the screen 75 is secured thereto, as shown. The plate 75′ prevents small sized kernels of pop-corn from passing through the screen 75 at this point and wedging in the narrow angle between the screen 75 and the screen 12. By this means, the difficulty noted and heretofore frequently encountered in machines of this type, is obviated.

The partitions 66 are provided with openings through which the delivery cone 44 extends. These openings in the partitions vary in size in accordance with the contour of the cone. The inner end of the cone 44 is provided with a head 77 which abuts against the partition 57. A bolt 78 extends through the partitions 55, 57 and a nut 79 threaded thereon engages the head 77. Pivoted clips 79′ fasten the cone 44 to the head 41 of the popping cylinder.

For convenience in repairing and cleaning the machine, the cone 44 is preferably removable and for this purpose, the cross strap 47 (see Fig. 2) is pivoted at one end to a bracket 80 fixed to the casing section 14 and the other end is slotted to detachably engage a lug 81 upon a bracket 82. A pin 83 passing through a hole in the lug 81 normally holds the cross piece 47 in place.
By removing the pin 83 strap 47 may be swung aside, then by removing the nut 79 upon bolt 78 and shifting by turning clips 79′ the delivery cone 44 may be slipped from place and access had to all portions of the popping cylinder.

The delivery cone 44 is provided with a slot or an opening 84 (see Figs. 10, 14, 15 and 16) which extends horizontally throughout the greater part of the length of the cone and communicates with all of the popping compartments 67 and 69 of the cylinder 12. A lip 85 formed on the cone at one side of the opening 84 is arranged to loosely engage or abut against the strip 76 to which the inner edge of the separator screen 75 is connected. As the cylinder rotates the popped corn passes from the separator screen 75 through opening 84 into the interior of the delivery cone 44 and from thence quickly passes out of the large open end of the delivery cone into a suitable receptacle placed to receive the same.

The inner end of the cone 44 is provided with inclined plates 86 which assist in throwing the corn towards the large outlet end of the cone. The outer end of the cone is provided with portions 87 formed of gauze of coarse mesh so that any unpopped corn or any imperfectly popped corn sifts from the cone back into the cylinder. A deflector 88 is fixed at its forward edge to a strip 89 secured to the inner face of the cone 44 and extending longitudinally throughout the greater portion of its length. The deflector 88 extends rearwardly (i. e. in a direction opposite to that in which the cylinder rotates) and partially over the longitudinal opening 84, and this deflector is preferably formed of gauze or coarse mesh so that while it prevents the large perfectly popped corn from passing back into the cylinder through the opening 84, it sifts from the well-popped corn all unpopped and imperfectly popped corn which passes back into the cylinder.

All unpopped corn sifted out by the screens 75, 87 and 88 passes back, as described, into the cylinder 12 and is there popped and picked up by the separator screen 75 while the imperfectly popped corn and waste passes out as described, through the opening 72, hopper 73 and discharge spout 74.

After the corn is popped it is liable to become charred or otherwise damaged if exposed to too much heat, and should be removed as soon as possible. For this reason the cone 44 is given a sharp pitch. To protect the popped corn on the separator screen 75 from the heat, the several compartments are provided with imperforate shields or baffle plates 90 segmental in section, as shown, and interposed between the separator screen 75 and the outer wall of the cylinder 12. These shields or baffle plates 90 are formed in sections, as shown, with an opening 91 between the sections so that the baffle plates will not materially interfere with the passage of the unpopped corn back onto the surface of the outer cylinder 12.

To protect the popped corn in the delivery cone 44, the two compartments 67 nearer the outlet end, are provided with imperforate baffles or shields 92, which are segmental in section and extend between the coarse screen 87 and the outer surface of cylinder 12.

A hood 93 depends from the forward end of the hood 15 (see Figs. 1 and 5) and extends over the outlet of the delivery cone 44 so that the hot air passing from the delivery cone will be collected and passed up through hood 93 into the hood 15 and utilized in the preliminary heater 16. To permit the ready removal of the cone 44 the lower portion of the hood is hinged as at 94 so that it can be swung up out of the way.

By the rotation of the cylinder in the direction of the arrow (see Fig. 4) the corn in the bottom of the cylinder is carried somewhat to one side and on to the half of the cylinder which is moved upwardly. For this reason the fire box 11 (see Fig. 4) is located beneath that half of the cylinder which moves upwardly. Heretofore it has been thought necessary to locate the burners or other source of heat directly beneath and closely adjacent the cylinder for best results and to avoid loss of heat. It is found however, that charing of the pop-corn is avoided if the burners are located somewhat below the bottom of the cylinder. For this reason, the burners 95 are located at the lower portion of the fire box and to avoid all loss of heat, the walls 96 of the fire box, are made double and filled with an intermediate packing 97 of asbestos or other suitable material.

The burners 95 are preferably of the Bunsen type and supplied with a mixture of air and gas through the inlet pipes 98. Other heating means may be used if desired.

Preferably, several burners 95 are employed arranged in series at different points throughout the length of the popping cylinder. Vertically disposed deflector plates 99 are arranged adjacent and between the burners. These deflectors are pivotally mounted at their lower ends upon rods 100 which extend through the outer wall of the fire box and casing (see Fig. 1) and are provided with adjusting handles 101. Each of the inlet pipes 98 to the burners, are provided with valves 102 and sight openings 103 are fixed in the wall of the base portion 10, so that the condition of each one of the burners may be rapidly inspected. The valves 102 for controlling the amount of gas to the burners and the baffles 99, are used for variably regulating the heat at different points along the length of the cylinder. For example, it will generally be desired to direct the heat toward the inlet end of the cylinder and keep this end more highly heated than the outlet end, so that the corn will be rapidly popped as it enters the popping chamber, and so that there will be less danger of burning the popped corn at the discharge end of the cylinder. If however, it is found that good unpopped corn is being discharged at the waste spout 74, more heat will be directed to the outlet end of the cylinder or the supply of corn will be cut down. The bottom of the fire box 12 is provided with a door 104 which may be opened for cleaning the fire box and the burners.

The improved popping machine may be operated continuously. Fresh corn is fed in separate charges through the preliminary heater 16 and the preliminary heating chambers 58 in cylinder 12. It is here thoroughly agitated and uniformly and gradually brought to popping heat. In the popping compartments 67 and 69, of the cylinder 12, the corn is popped and the perfectly popped corn quickly and rapidly removed while the imperfectly popped corn and other waste is automatically and continuously delivered through the hopper 73 and spout 74. The amount of corn and the heat to the popping cylinder 12 and preliminary heater 16, may be nicely regulated so that the machine may be operated with little waste of corn and with economy in the amount of gas used.

Hood 15 is provided at its discharge end with a ventilation flue or chimney 105, which is provided with a damper 106 by which the passage of hot air and products of combustion through the machine may be further regulated. A door 107 in the side of the casing 13, permits the inspection of the operation of the machine from time to time.

It is obvious that numerous changes may be made in the details of structure without departure from the essentials of the invention.

Having described my invention what I claim as new and desire to secure by Letters Patent is:—

1. In an automatic, continuously operating popping machine, the combination of a popping chamber, means arranged to effect a continuous, retarded feed of the unpopped corn through said chamber, in contact with the outer popping surface thereof and means arranged to continuously separate the popped corn from the popping surface and discharge the same from the chamber, substantially as described.

2. In an automatic, continuously operating popping machine, the combination of a popping chamber having an inlet for corn and a discharge outlet for waste, means arranged to effect a continuous, gradual feed of the unpopped corn through said chamber from said inlet to said waste outlet and means arranged to continuously separate the popped corn at points intermediate said inlet and outlet and to continuously discharge the same from the popping chamber, substantially as described.

3. In an automatic, continuously operating popping machine, the combination of a popping chamber having an inlet for corn at one end and a discharge outlet for waste at the opposite end and having an inclined popping surface arranged to effect a gradual feed of the unpopped corn through the popping chamber from said inlet to said waste outlet, means for retarding the passage of the unpopped corn over the popping surface from said inlet to said outlet and a separator arranged to continuously remove the popped corn from all portions of the popping surface and to discharge the same from the popping chamber, substantially as described.

4. In an automatic, continuously operating popping machine, the combination of a popping chamber, of means arranged to effect the continuous gradual feed of the unpopped corn through said chamber from end to end thereof, means arranged to continually separate the popped corn from all portions of the popping chamber and discharge the same therefrom and means for variably regulating the application of heat to different points of said chamber from end to end thereof, substantially as described.

5. In an automatic, continuously operating popping machine, the combination of a revoluble popping cylinder, having an inlet for corn and a discharge outlet for waste, means for effecting a continuous, gradual, retarded feed of the unpopped corn through said popping cylinder from said inlet to and out of said waste outlet and means arranged to continuously separate the popped corn at points intermediate said inlet and said waste outlet and to continuously discharge the same from the popping chamber, substantially as described.

6. In an automatic, continuously operating popping machine, the combination of a revoluble popping cylinder having an inlet for the unpopped corn at one end and a discharge outlet for waste at its opposite end, means arranged to effect a retarded, continuous feed of the unpopped corn through said cylinder from said inlet to said waste outlet and a separator arranged to remove the popped corn from all portions of the popping chamber of said cylinder between said inlet and outlet and to discharge the same therefrom, substantially as described.

7. In an automatic, continuously operating popping machine, the combination of a revoluble popping cylinder having an inlet for the unpopped corn at one end and a discharge outlet for waste at its opposite end, means arranged to effect a retarded, continuous feed of the unpopped corn through said cylinder from said inlet to said waste outlet, a separator arranged to remove the popped corn from the popping chamber of said cylinder between said inlet and said outlet and to discharge the same therefrom, and means for variably regulating the application of heat at different points of said cylinder between the ends thereof, substantially as described.

8. In an automatic, continuously operating popping machine, the combination of a popping chamber having an inlet for the unpopped corn at one end, a discharge outlet for waste at the opposite end and an inclined bottom portion between said inlet and outlet arranged to effect a gradual feed of the unpopped corn through said chamber from said inlet to and through said waste outlet, a series of baffles arranged to retard the feed of the unpopped corn over said inclined bottom portion and means above said bottom portion and said baffles arranged to continuously separate the popped corn at points between said inlet and said outlet and to discharge the same from the popping chamber, substantially as described.

9. In a popping machine, the combination of a popping chamber having an inlet for corn at one end and a discharge outlet for waste at its opposite end, a series of baffles for retarding the feed of corn from said inlet to said waste outlet and means between the baffles for separating the popped corn, substantially as described.

10. In a popping machine, the combination with a revoluble popping cylinder, of separator means in said cylinder for removing the popped corn, and a series of baffles between said separators and the outer wall of said cylinder for retarding the feed of unpopped corn therethrough, substantially as described.

11. In an automatic, continuously operating popping machine, the combination of a revoluble popping cylinder, means for feeding unpopped corn into one end of said cylinder, said cylinder having an inclined bottom portion arranged to effect a gradual feed of the unpopped corn from the inlet end to the opposite end of said cylinder, a series of baffles arranged between the ends of said cylinder arranged to retard the feed of the unpopped corn therethrough and separator means extending through said cylinder arranged to continuously separate the popped corn and discharge the same from said cylinder, substantially as described.

12. In an automatic, continuously operating popping machine, the combination of a revoluble popping cylinder having an inlet for unpopped corn at one end and a discharge outlet for waste at its opposite end, means for feeding unpopped corn into said inlet, said popping cylinder having an inclined bottom portion for effecting the continuous, gradual feed of the unpopped corn through said cylinder from said inlet to said waste outlet, a series of baffles arranged to retard the feed of the unpopped corn through the cylinder from said inlet to said waste outlet and separator means extending between said inlet and said outlet and arranged to continuously separate the popped corn and discharge the same from said cylinder, substantially as described.

13. In popping machines, the combination with a popping chamber having an inclined bottom portion, a series of cross partitions arranged between the ends of said chamber and dividing the same into compartments, openings in said partitions through which the unpopped corn is fed and means in each of said compartments for removing the popped corn, substantially as described.

14. In popping machines, the combination with a revoluble popping cylinder, of a series of cross partitions arranged between the ends of said cylinder, openings in the outer edge portions of said partitions through which the unpopped corn is fed, and separator means between each pair of partitions for removing the popped corn, substantially as described.

15. In popping machines, the combination with a revoluble popping cylinder, of a series of cross partitions arranged between the ends of said cylinder dividing the same into compartments, openings in the outer edge portions of said partitions through which the corn is fed, separator means in said compartments for removing the popcorn and a conveyer extending through said partitions and communicating with said separator means, substantially as described.

16. In popping machines, the combination with a revoluble popping cylinder having an inlet for corn at one end and a discharge outlet for waste at its opposite end, a series of cross partitions between the ends of said cylinder, openings in the outer edge portions of said partitions through which the unpopped corn is fed from said inlet to said waste outlet and means for removing the popped corn, substantially as described.

17. In popping machines, the combination with a revoluble popping cylinder having an inlet for corn at one end and a discharge outlet for waste at its opposite end, a series of cross partitions between the ends of said cylinder, openings in the outer edge portions of said partitions through which the unpopped corn is fed from said inlet to said waste outlet, a separator sieve between each pair of partitions for removing the popped corn and a delivery chute extending through said partitions and communicating with said separator sieve, substantially as described.

18. In popping machines, the combination with a revoluble popping cylinder having an inclined bottom portion, of a series of cross partitions having openings in their outer edge portions for regulating the feed of the unpopped corn over said inclined bottom portion and means for removing the popped corn, substantially as described.

19. In popping machines, the combination with a revoluble popping cylinder having an inclined bottom portion and having an inlet for corn at one end and an outlet for waste at the opposite end, a series of cross partitions having openings in their outer edge portions for regulating the feed of corn over said inclined bottom portion and between said inlet and said waste outlet, and a separator sieve between said partitions for removing the popped corn, substantially as described.

20. In an automatic, continuously operating popping machine, the combination with a horizontal, revoluble popping cylinder having an inlet for unpopped corn at one end and a discharge outlet for waste at the opposite end and having an inclined bottom portion arranged to effect a gradual feed of the unpopped corn over such bottom portion from said inlet to and out of said waste outlet, means for feeding unpopped corn into said cylinder through said inlet and a combined separating and discharging device disposed in said cylinder between said inlet and said waste outlet, arranged to continuously separate the popped corn from all portions of said cylinder and to continuously discharge the same therefrom, substantially as described.

21. In an automatic, continuously operating popping machine, the combination of a horizontal, revoluble popping cylinder having an inlet for the unpopped corn at one end, means for continuously feeding the unpopped corn into said cylinder through said inlet, the opposite discharge end of said cylinder being slightly larger than said inlet end to effect the gradual feed of the unpopped corn over the inclined bottom portion thereof, a series of baffles in said cylinder arranged to regulate the feed of the unpopped corn over the inclined bottom portion of said cylinder and a separator extending through said cylinder and arranged to continuously separate the popped corn from all parts of the inclined bottom portion thereof between said inlet and said outlet and to continuously discharge the same from said cylinder, substantially as described.

22. In a popping machine, the combination of a horizontal, revoluble popping cylinder having an inlet for corn, the opposite end of said cylinder being slightly larger than the inlet, a series of cross partitions having openings in their outer edge portions and arranged between the ends of said cylinder for regulating the feed of unpopped corn over the inclined bottom portion of said cylinder, separator sieving means arranged between said partitions for removing the popped corn and a conveyer extending through said partitions and communicating with said sieving means, substantially as described.

23. In an automatic, continuously operating popping machine, the combination with a horizontal, revoluble popping cylinder having an inlet for the unpopped corn at one end and a discharge outlet for waste at its opposite end, means for continuously feeding unpopped corn into said cylinder through said inlet, the opposite discharge end of said cylinder being slightly larger than said inlet end to effect the gradual feed of the unpopped corn through said cylinder from said inlet to and out of said waste outlet and over the inclined bottom portion thereof, and a combined separating and discharging device disposed in said cylinder between said inlet and said waste outlet arranged to continuously separate the unpopped corn and to continuously discharge the same from said cylinder, substantially as described.

24. In a popping machine, the combination of a horizontal, revoluble popping cylinder having an inlet for corn, the opposite end of said cylinder being slightly larger than the inlet, a discharge outlet for waste at the larger end of said cylinder, a series of cross partitions dividing the cylinder into compartments and having openings in their outer edge portions for regulating the feed of unpopped corn and a separator sieve in said compartments for removing the popped corn, substantially as described.

25. In popping machines, the combination with a revoluble popping cylinder having an inlet for corn at one end, a series of cross partitions having openings in their outer edge portions for regulating the feed of unpopped corn toward the opposite end of said cylinder, deflector plates opposite said openings for preventing the return movement of the corn and means for removing the unpopped corn, substantially as described.

26. In an automatic, continuously operating popping machine, the combination of a revoluble popping cylinder, having an inlet for the unpopped corn at one end, means for continuously feeding the unpopped corn into said cylinder through said inlet, a separator sieve in said cylinder for continuously removing the popped corn and means outside of said sieve arranged to effect a gradual, retarded feed for the unpopped corn from said inlet toward the opposite end of said cylinder and over the outer wall thereof, substantially as described.

27. In an automatic, continuously operating popping machine, the combination of a revoluble popping cylinder having an inlet for the unpopped corn at one end, means for continuously feeding the unpopped corn into said cylinder through said inlet, a separator sieve extending through said cylinder arranged to continuously remove the popped corn, a delivery chute extending into said cylinder and communicating with said sieve for continuously discharging the popped corn, and a series of baffles outside of said sieve and delivery chute, arranged to regulate the feed of the unpopped corn from said inlet toward the opposite end of said cylinder and over the outer wall thereof, substantially as described.

28. In an automatic, continuously operating popping machine, the combination of a revoluble popping cylinder having an inlet for the unpopped corn at one end and a discharge outlet for waste at its opposite end, a separator sieve and a delivery chute extending through said cylinder arranged to continuously remove and discharge the popped corn, and a series of baffles outside of said sieve and delivery chute for regulating the feed of the unpopped corn through said cylinder from said inlet to said waste outlet, substantially as described.

29. In an automatic, continuously operating popping machine, the combination of a revoluble popping cylinder having an inlet for unpopped corn at one end and a discharge outlet for waste at its opposite end, means for continuously feeding the unpopped corn into said cylinder through said inlet, said cylinder having an inclined bottom portion for effecting the gradual feed of the popped corn therethrough from said inlet to said waste outlet and over the outer wall of said cylinder, a separator sieve and a delivery chute extending through said cylinder between said inlet and said waste outlet arranged to continuously remove the popped corn and discharge the same from said cylinder and a series of baffles outside of said sieve and delivery chute for regulating the feed of unpopped corn from said inlet to said waste outlet, substantially as described.

30. In a popping machine, the combination of a revoluble popping cylinder having an inclined bottom portion, an inlet for corn at one end and a discharge waste outlet at the opposite end, a separator sieve and delivery chute extending through said cylinder for removing the popped corn and a series of cross partitions outside of said delivery chute having openings in their outer edge portions for regulating the feed of unpopped corn between said inlet and said waste outlet, substantially as described.

31. In popping machines, the combination with a revoluble popping cylinder, of a delivery cone for popped corn removably mounted in said cylinder and discharging through one end thereof, said cone having a longitudinal inlet opening and a separator sieve fixed at one edge to said cylinder and at its other edge communicating with the inlet opening of said cone, substantially as described.

32. In popping machines, the combination with a revoluble popping cylinder, of a delivery cone for popped corn in said cylinder and discharging through one end thereof, said cone having a longitudinal inlet opening, a separator sieve for separating the popped from the unpopped corn extending about said cone and communicating with the inlet opening thereof to deliver the popped corn thereto and a deflector in said cone extending in circumferential direction over said opening to prevent the return of the popped corn, substantially as described.

33. In popping machines, the combination with a revoluble popping cylinder, of a delivery cone for popped corn in said cylinder and discharging through one end thereof, said cone having a longitudinal inlet opening, a separator sieve for separating the popped from the unpopped corn communicating with the inlet opening of said cone to deliver the popped corn thereto a separating deflector of foraminous material in said cone and extending over said inlet opening to prevent the return of the popped corn, substantially as described.

34. In popping machines, the combination with a popping cylinder, of a delivery cone removably mounted in said cylinder, and opening through one end thereof, said cone having a longitudinal inlet slot, an inclined supporting strip fixed in said cylinder and arranged on one side of the inlet slot of said cone and a curved separator screen in said cylinder secured at one edge to the wall thereof and at its other edge to said supporting strip, substantially as described.

35. In popping machines, the combination with a popping cylinder of foraminous material, of a sieve for separating the popped corn in said cylinder and a protecting guard plate arranged in said cylinder between the outer wall thereof and said separator sieve, substantially as described.

36. In popping machines, the combination with a popping cylinder of foraminous material, of a sieve for separating the popped corn in said cylinder and protecting guard-plates of imperforate material arranged in said cylinder between the outer wall thereof and said separator sieve, substantially as described.

37. In an automatic, continuously operating popping machine, the combination of an inclosing casing, of a popping chamber in said casing having an inlet for corn at one end and a discharge outlet for waste at its opposite end and means for effecting the gradual feed of the unpopped corn through the same from said inlet to said waste outlet, a preliminary heater for the unpopped corn in said casing above said popping chamber having conveyer means for feeding the corn therethrough, means for feeding corn to said preliminary heater, means for feeding corn from said preliminary heater to the inlet of said popping chamber and means for continuously separating and discharging the popped corn from said popping chamber, substantially as described.

38. In an automatic, continuously operating popping machine, the combination of a casing comprising a main body portion and an upper hood, a popping chamber in said main body portion having means for feeding the unpopped corn therethrough and means for continuously separating and discharging the popped corn, a preliminary heater in said hood above said cylinder having conveyer means for feeding the unpopped corn therethrough, means for feeding corn to said preliminary heater, means for feeding corn from said preliminary heater to said popping chamber, a fire box in said casing below said popping chamber and means for regulating the passage of heat between said main body portion and said hood, substantially as described.

39. In an automatic, continuously operating popping machine, the combination of a casing, a revoluble popping cylinder in said casing having means for feeding the unpopped corn therethrough and for continuously separating and discharging the popped corn, a revoluble heating cylinder in said casing above said popping cylinder having conveyer means for feeding the unpopped corn therethrough, means for feeding corn to said heating cylinder and means for feeding corn from said heating cylinder to said popping cylinder, substantially as described.

40. In popping machines, the combination with an inclosing casing, of a popping chamber in said casing, a preliminary heater in said casing above said popping chamber, conveying means for feeding the corn through said preliminary heater, a hopper at the inlet of said heater, means for feeding corn from said hopper to said heater, a hopper at the outlet end of said heater and means for feeding corn therefrom to said popping chamber, substantially as described.

41. In popping machines, the combination with an inclosing casing, of a revoluble popping cylinder in said casing, a revoluble heating cylinder in said casing above said popping cylinder, means for feeding corn through said heating cylinder, means for feeding corn from said heating cylinder to said popping cylinder, and driving connections between said cylinders to rotate the same in unison, substantially as described.

42. In popping machines, the combination with an inclosing casing, a revoluble popping cylinder in said casing, a revoluble heating cylinder in said casing above said popping cylinder, conveyer means for feeding corn therethrough, a hopper at the outlet end of said heater cylinder, a rotary valve connected to said heater cylinder for feeding corn thereto from said hopper, a hopper at the outlet end of said heater cylinder and a rotary valve connected to said popping cylinder for feeding corn thereto from said second hopper substantially as described.

43. In a popping machine, a preliminary heater for the unpopped corn comprising a revoluble cylinder and a series of oppositely wound spirals alternately arranged side by side in said cylinder, substantially as described.

44. In a popping machine, a preliminary heater for the unpopped corn comprising a revoluble cylinder of gauze and a series of oppositely wound spirals of gauze alternately arranged within said cylinder, substantially as described.

45. In a popping machine, a preliminary heater for the unpopped corn comprising a revoluble cylinder of wire gauze, cross partitions dividing said cylinder into compartments, central openings in each alternate partition, openings at the edges of the other partitions and oppositely wound spirals of gauze alternately arranged in said compartments for feeding the corn back and forth from center to the periphery of said cylinder and through said openings from compartment to compartment, substantially as described.

46. In a popping machine, a preliminary heater for the unpopped corn comprising a revoluble cylinder, cross partitions in said cylinder dividing the same into compartments, central openings in each alternate partition opening at the edges of the other partitions, oppositely wound spirals alternately arranged in said compartments and inclined plates opposite said openings for deflecting the corn from compartment to compartment through said cylinder, substantially as described.

47. In popping machines, the combination with a popping chamber, of a preliminary heater for the unpopped corn comprising a revoluble cylinder, oppositely wound spirals alternately arranged side by side in said cylinder, means for feeding separate charges of corn to said heating cylinder and means for feeding corn from said heater to said popping chamber, substantially as described.

48. In popping machines, a revoluble popping cylinder, an inlet for corn at one end of said cylinder, a preliminary heater comprising a series of oppositely wound spirals arranged side by side at the inlet end of said cylinder, substantially as described.

49. In popping machines, a revoluble popping cylinder, an inlet for corn at one end of said cylinder, a series of cross partitions at the inlet end of the cylinder forming preliminary heating compartments, openings alternately disposed at the center and edge portions of said partitions and oppositely wound spirals alternately arranged in said compartments for feeding the corn through said openings, substantially as described.

50. In popping machines, a revoluble foraminous popping cylinder having an inlet for corn at one end, means for feeding separate charges of corn through said inlet, a series of cross partitions forming preliminary heating compartments at the inlet end of said cylinder and a series of oppositely wound foraminous spirals alternately arranged in said compartments for feeding the corn therethrough, substantially as described.

51. In an automatic, continuously operating popping machine, the combination of a popping chamber having an inlet for the unpopped corn at one end, means for continuously feeding the corn into said chamber through said inlet, a preliminary heater for the unpopped corn at the inlet end of said chamber, having conveyer means for feeding the unpopped corn therethrough, means in said cylinder arranged to effect the gradual, retarded feed of the unpopped corn from said preliminary heater to the opposite discharge end of said chamber and means in said cylinder extending from said preliminary heater to the discharge end thereof arranged to continuously separate the popped corn and continuously discharge the same therefrom, substantially as described.

52. In popping machines, a revoluble popping cylinder having a preliminary heating compartment at its inlet end, means for feeding the unpopped corn gradually from said preliminary heater toward the opposite end of said cylinder, means for removing the popped corn therefrom, heating devices below said cylinder and means for variably regulating and directing the heat therefrom at different points between the ends of said cylinder, substantially as described.

53. In a popping machine, the combination with a popping chamber, means for effecting a gradual feed of unpopped corn from one end to the other of said chamber, a series of burners arranged beneath said chamber from end to end thereof and a series of swinging deflectors between said burners for directing the heat therefrom to different points, substantially as described.

NATHANIEL B. POST.

Witnesses:
LILLIAN PRENTICE,
FRED GERLACH.